…

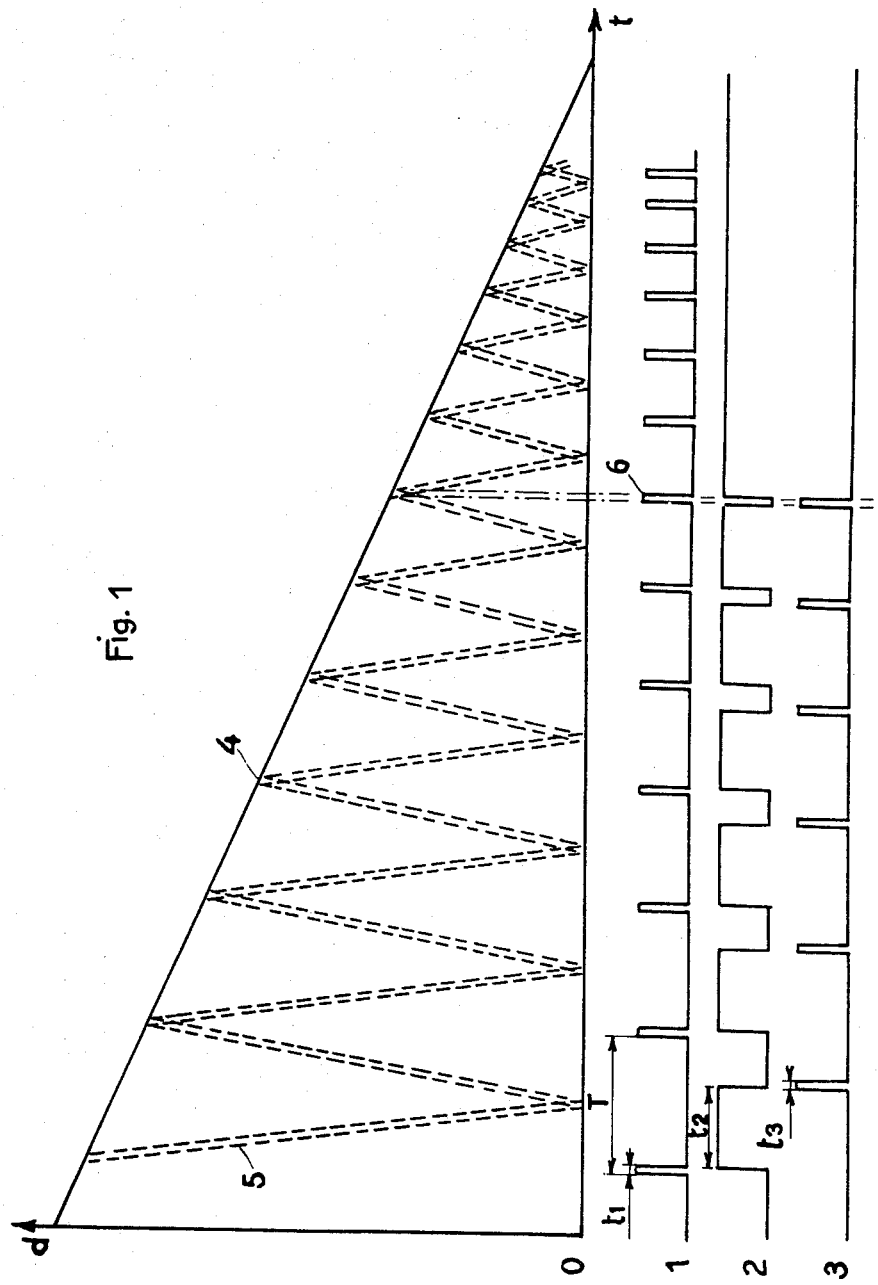

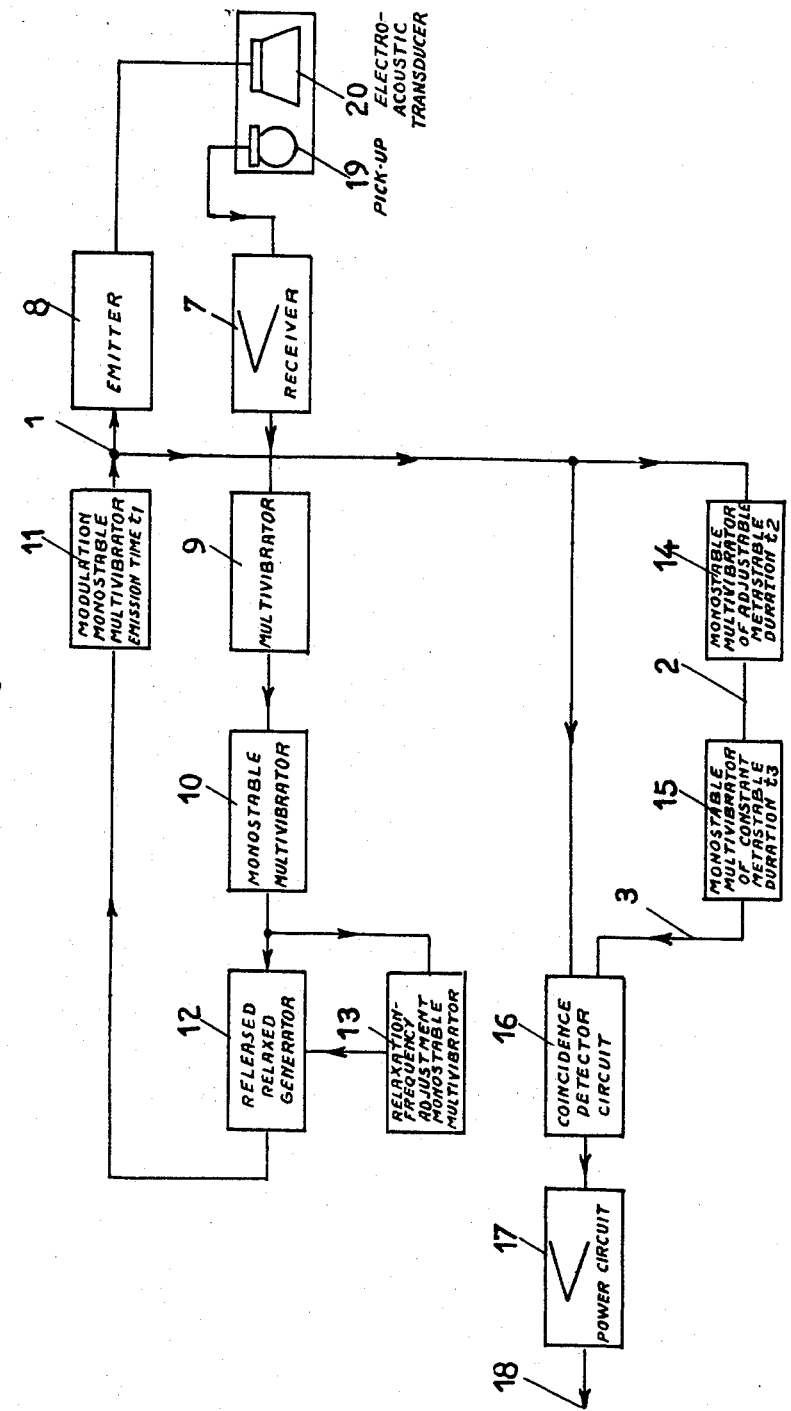

United States Patent Office 3,412,370
Patented Nov. 19, 1968

3,412,370
AUTOMATIC RELEASE CONTROL APPARATUS
Roger Massal, Toulouse, France, assignor to French State, represented by the Minister of Armed Forces, Ministerial Delegation for Weapons, Technical Direction of Land Weapons, Manufacturing Works of Toulouse, Toulouse, France
Filed Jan. 3, 1967, Ser. No. 606,885
Claims priority, application France, Jan. 4, 1966, 44,691
7 Claims. (Cl. 340—1)

ABSTRACT OF THE DISCLOSURE

Apparatus for automatically controlling any desired mechanism when the distance from the apparatus to a body having an acoustically reflecting surface reaches a predetermined value comprises a pickup device receiving sound signals reflected by the reflecting surface, an emitter of electrical signals electrically connected to the pickup device so as to transmit an electrical signal upon each reception of a sound signal by the pickup device, and electroacoustic transducer connected to the emitter and adapted to emit a sound signal each time an electrical signal is transmitted from the emitter, means for emitting an initial sound signal toward the acoustically reflecting surface, a coincidence detector circuit having first and second input lines and one output line, the first input line being connected to the input of the emitter and the second input line being connected to the first input line and including means for shifting the transmission of signals of the first input line by a time period corresponding to the time necessary for a sound signal to cover the predetermined distance from the apparatus to the reflective surface and back, and a power circuit connected to the output line of the coincidence detector to control the desired mechanism when a signal transmitted through the second input line coincides with the next signal transmitted through the first input line of the coincidence detector.

---

This invention relates in general to means for automatically controlling the release of a mechanism for a given value of the distance from a movable body to said apparatus, and has specific reference to an apparatus of this character which operates by audio-wave sounding.

Conventional audio-wave sounding systems are operated by the amplitude of an echo, by pulse sounding at a fixed recurrence frequency, or by frequency modulation. The use of devices of this character is ill suited for solving problems arising from the determination of the distances of a body moving in a gaseous medium either at high speed or in a wide range of distances.

It is a primary object of this invention to provide an apparatus adapted automatically to trip or release any desired mechanism for a preselected distance of a sound wave reflection zone, this distance ranging for example from twenty inches to several hundreds of feet, with an unlimited approach distance in the case of decreasing values, the evolution speed of the distance attaining up to one-tenth of the rapidity of the audio wave in the medium separating the device from the reflection zone while preserving reasonable tolerances.

It is another object of the present invention to provide an apparatus capable of performing the function which is constructionally relatively simple and economical.

Therefore, the present invention provides a novel method constituting a substantial improvement over hitherto known means.

In order to afford a clearer understanding of this invention and of the manner in which the same may be carried out in practice, reference will now be made to the accompanying drawings illustrating diagrammatically by way of example a typical form of embodiment of the invention. In the drawings:

FIGURE 1 is a diagram showing as a function of time the distance from the apparatus of the body provided with a sound-reflection surface, and also sounding audio waves directed towards and reflected by said surface, together with the electrical signals emitted by reference members of the apparatus.

FIGURE 2 is an electrical wiring diagram of the component elements of the apparatus.

In order to simplify the disclosure, a first section thereof will set forth the embodiment of the essential functions of the apparatus, the embodiment concerning certain complementary functions necessary for a proper operation of the basic principle of this invention being described in another section of the specification.

SECTION 1

Assuming that the cycle is commenced, the sounding procedure is as follows:

On receiving an echo, a receiver releases the emission of a short-duration impulse of audio waves which progresses towards the reflection zone, is reflected thereby and travels in the opposite direction until it strikes the receiver again, the same cycle being subsequently reproduced.

Obviously, what constitutes the element controlling the duration of the time period elapsing between two successive emissions is the delay resulting from the wave travel in the surrounding medium, between the device and the reflection zone. This delay is significant of the distance, as the rapidity of propagation of the audio waves in the medium is already known.

The upper portion of the diagram of FIGURE 1 illustrates this principle. The reference numeral 4 denotes the evolution of the distance $d$ as a function of time $t$, the path of the train of sounding waves being illustrated in the form of dashed lines 5. It is clear that one of the specific features of the principle is that the sounding recurrence frequency varies as an inverse function of distance.

As the sounding cycle has begun, the receiver 7 of FIGURE 2 receives a signal corresponding to an echo and amplifies same. This signal is fed to a monostable multivibrator 9 of long unstable period in comparison with the emission time and the front of the signal generated by this multivibrator is fed to another multivibrator 10 which delivers in turn a pulse of a force sufficient to cause the tripped relaxed generator 12 to deliver a short signal well located in time and which, when fed to the modulation multivibrator 11, causes the latter to deliver a signal of preselected duration which is adapted to block the emitter 8 during the same time lapse. Under these conditions this emitter will generate an electrical signal of a frequency equal to the mechanical resonance frequency of the electroacoustic transducer 20 converting the electrical signal into acoustic pressure waves. This transducer may be for example of the piezoelectric, magnetostrictive ionic or gas type.

The function of the cascade monostable multivibrators 9 and 10 is to prevent the fraction of energy picked up directly by the receiver either acoustically or electrically from creating, during the emission, a permanent feedback likely to prohibit any satisfactory operation. In this respect the multivibrator 9 has an unstable period substantially longer than that of the multivibrator 11 corresponding to the emission time, in order to avoid any detrimental effect resulting from damped oscillations of mechanical components stimulated during the emission. It is quite obvious that as the multivibrator 9 is already unstable as a consequence of the reception of an echo having released the fresh emission, it will not be disturbed by this fresh emission and therefore this multivibrator 9 will protect the other multivibrator 10 and the other component elements of the system from the effects of the direct action produced by the echo, whereby the complete assembly becomes again sensitive as the multivibrator 9 resumes its stable condition.

It should be noted that multivibrators 9 and 10 may be replaced by an "AND" circuit, the first input being connected to the output of the receiver, the second input being connected through an "OR" circuit to the modulation multivibrator either directly or through the medium of a memory monostable multivibrator increasing the inhibiting period in order to avoid the above-mentioned stray vibration effects.

The short train of waves generated by the transducer 20 is propagated towards the reflection surface according to a mode subordinate to the technological constitution of the acoustic generating element, this train of waves being thus reflected and therefore returned to the apparatus in the form of dispersed waves; it is thus picked up by the pickup device 19 and thereby converted into electrical current fed to the input of receiver 7. The wave train covers the distance to and from the reflection surface at a speed $c$ depending on the surrounding medium (331 meters per second, $\pm 0.60$ m./s. per degree centigrade in the case of atmospheric air). The above-defined cycle is then repeated.

The pickup 19 may in certain cases consist of the same element as the one (20) utilized for emitting the waves, and reversible elements such as magnetostrictive (Joule and Villari effects) or piezoelectric transducers are particularly adapted for this application. In this case a limiter comprising a pair of diodes disposed head to tail, or the like, may be used for limiting the amplitude during the emission across the terminals of the receiver to avoid an abnormally high saturation or any damage to the input circuits.

As shown in the upper portion of the diagram of FIGURE 1, the time elapsing between two successive emissions is proportional to the distance between the device and the reflection zone, this time being responsive to this distance according to the formula $$T = \frac{2d}{C}$$

wherein T is the duration of one period in the series of emissions, $d$ being the distance from the device to the reflection surface during this period and C the wave speed in the wave propagation medium.

The change in the electrical condition of the output circuit 18 controlling the release of the mechanism is controlled by a coincidence detector circuit adapted to compare the duration of each period in the series of emissions to a reference period corresponding to the given value of said distance.

Each modulation impulse produced by the emitter 8 under the control of the modulation multivibrator 11 is also fed to one of the two inputs of the coincidence detector circuit 16, the rear face of this signal tripping a monostable reference multivibrator of adjustable unstable period 14, and as this last-named multivibrator resumes its inoperative condition it releases the monostable multivibrator 15 of constant unstable period of which the signal is fed to the second input of the coincidence detector circuit 16. This last-named circuit 16 may consist of a logical AND circuit.

To simplify the circuitry and if the distances are only of decreasing order the multivibrator 15 may be dispensed with and in this case the other multivibrator 14 feeds directly the other input of circuit 16. The lower portion of FIGURE 1 illustrates diagrammatically the mode of operation of this circuit 16; in this figure:

1 denotes the signal issuing from multivibrator 11, T being the period corresponding to each sounding phase and $t_1$ the emission time;

2 denotes the signal issuing from multivibrator 14 according to the duration $t_2$ adjustable as a function of the given distance value; and 3 denotes the signal issuing from multivibrator 15 and having a duration $t_3$ equal to the metastable period.

When the signals issuing from multivibrator 11 and multivibrator 15 are simultaneous, as at 6 in FIGURE 1, the coincidence detector circuit 16 releases the power circuit 17 producing in the output line 18 the electrical condition capable of tripping the mechanism to be controlled.

The electrical release subordinate to the simultaneity of the signals at the inputs of circuit 16 takes place when the following inequalities are obtained:

$$t_1 + t_2 < \frac{2d}{C} < t_1 + t_2 + t_3$$

with $$T = \frac{2d}{C}$$

The magnitude adjustable as a function of the given value of distance $d$ is the unstable period $t_2$ of multivibrator 14 of which the value is selected by operating a manual control which, if the wave propagation medium is homogeneous, may be provided with a direct-reading distance unit scale.

The speed of sound in gases, for example air, varies considerably with the gas temperature. Therefore, a self-acting device for correcting the unstable duration $t_2$ may advantageously be associated with the mounting of the reference multivibrator 14 in the form of a nonlinear temperature-responsive element, such as a thermistor, this properly selected element being disposed in the time constant circuit of the mounting of this multivibrator 14.

Due to the discontinuity of the sounding, it is essential that the tolerances in the release distance be voluntarily increased to avoid the risk that any sounding takes place when the desired value is attained; to this end, considering the limit cases it is necessary to adjust the duration $t_3$ delivered by multivibrator 15 according to the equality $$t_1 + t_3 = \frac{T\nu}{C}$$

with $$T = \frac{2d}{C}$$

$\nu$ being the rate of variation of the distance.

As the emission time $t$ is set according to transmission requirements, this is the duration to be preset accordingly. In certain cases, the value $t_3$ thus found must be widened to permit a proper operation of the electrical mounting.

SECTION 2

Outside the members necessary for establishing the essential functions of the apparatus which are discussed hereinabove, it is definitely necessary in practice to associate therewith complementary elements capable of imparting really operative possibilities of use thereto.

More particularly, if the apparatus is to be operated for decreasing distances, which is the most frequent case, when set for actual operation its distance from the acoustically reflecting surface is considerably greater than its practical range. Under these conditions, the ordinated modulation cycle of the emitter from the echos received by the pickup device cannot be started since this requires the reception and therefore the emission of a signal, and therefore it is necessary to provide means for starting this operation when the latter is permitted by the degree of proximity of the acoustically reflecting surface.

To this end the pulse generator 12, in addition to its immediate operation (by being tripped by the signals issuing from the monostable multivibrator 10), emits by inherent relaxation periodic pulses at a low frequency corresponding to a distance well above the practical average range of the acoustic means implemented. Thus, when the contact is established with the reflection surface and the first signal is received, the form of operation contemplated is started and subsequently maintained, the relaxed operation of said circuit 12 then ceasing due to the tripped operation which, in all cases, precedes and neutralizes this relaxed operation.

It is also necessary to foresee that during the regular mode of operation external circumstances of transitory or contingent nature may interfere with the continuation of this mode of operation. This is observed notably when the reflection zone is heterogenous and comprises unequally reflecting zones. It may happen that, as a consequence of the change in the orientation of the body carrying said reflection zone, echos adequately detectable during one sounding become nondetectable during a subsequent sounding. In this case, if only the arrangements described hereinabove are resorted to, the operation is discontinued completely until another main bang is emitted by the operation under relaxation conditions, and if the distances change at a fast rate, this normal operation may not be resumed before the given value of the preset distance has actually been attained.

To remove the cause of faulty operation, the relaxation frequency of the relaxed released pulse generator 12 is continuously corrected by a mean voltage proportional to the frequency of the preceding soundings. To this end the signals issuing from the multivibrator 10 release a monostable multivibrator 13 of which the signals having a selected duration and amplitude are suitably integrated and subsequently fed for correction purposes to the relaxation circuit of generator 12, whereby the initially very low relaxation frequency, in the absence of reinjected pulses, increases gradually as the sounding frequency increases at each incoming echo. If the regular operation is discontinued as a consequence of the above-described detrimental circumstances, the next emission is repeated not after an abnormally long delay, as would be the case without the correction of the monostable multivibrator 13, but rather rapidly so that this regular operation is resumed immediately when the detrimental circumstances have disappeared.

However, it is necessary that the energy reinjected into the circuit 12 by circuit 13 be carefully adjusted so that the resulting reaction cannot bring about a spurt in the cycle preceding the one actually produced by the perception of echos and that on the contrary it accelerates or decelerates only as a consequence of a reduction or an increment in the distance from the reflection surface to the apparatus. Moreover, this circuit should cause only a very slight delay in case the acoustically reflecting surface moves away from the apparatus.

In order to avoid any instability caused by continuous-action noises of miscellaneous origin, a circuit capable of automatically controlling the sensitivity threshold is associated with the pickup device 7.

Furthermore, in order to avoid as much as possible the parasitic effects of surrounding noises, a band filter is incorporated in the receiver, the band-pass of this filter being calculated as a function of pickup frequency variations caused by the Doppler-Fizeau effect.

When starting the apparatus, the power and coincidence circuits 17 and 16 are fed only after a time period unsufficient to ensure the stabilization of the operation of the other components. Thus, any untimely tripping of the power circuit 17 is avoided when starting the operation of the apparatus.

*General remarks*

The above description does not include the details of the technological means permitting the practical embodiment of the various component elements described primarily by their specific functions. In fact, these component elements are well known to anybody conversant with the art and various combinations of means conventional in electronics may be used in their construction. More particularly, these component elements may consist of semiconductors such as PNP and NPN transistors, of unijunction elements, of thyristors and various diodes.

The apparatus according to this invention lends itself to a great number of applications such as inter alia:

(a) The use, close to the ground, of means capable of retarding the fall of loads or machines of all kinds dropped by parachute;

(b) The automatic keeping of a minimum relative spacing between self-driven vehicles circulating in file;

(c) The use of conventional or nuclear explosives at a predetermined distance from a target;

(d) Measuring distances whenever conventional means are defective or difficult to use.

Under these conditions, it is obvious that many modifications and variations may be brought in the practical actuation of this invention without departing from the spirit and scope thereof, as set forth in the appended claims.

What I claim is:

1. An apparatus for automatically controlling the release of any desired mechanism when the distance from this apparatus to a body having an acoustically reflecting surface assumes a predetermined value, which comprises a pickup device receiving sound signals returned by said reflection surface, an emitter of eletrical signals, electrical and electronic means connecting said pickup device to said emitter and adapted to cause said emitter to transmit an electrical signal upon each reception of sound signal by said pickup device, an electroacoustic transducer connected to said emitter and adapted to emit a sound signal each time an electrical signal is transmitted from said emitter, means adapted to emit an initial sound signal towards said acoustically reflecting surface, a coincidence detector circuit having first and second input lines and one ouput line, said first input line being connected to the input of said emitter, said second input line being connected to said first input line, electrical and electronic means mounted in said second input line of said coincidence detector for shifting the transimssion of signals of said first line by a time period corresponding to the time neecssary for a sound signal to cover the given distance from the apparatus to the acoustically reflecting surface and back, and a power circuit connected to the output line of said coincidence detector circuit and adapted electrically to control the tripping of said mechanism when a signal transmitted through said second input line of said coincidence detector is coincident with the next signal transmitted through said first input line of said coincidence detector.

2. Apparatus as set forth in claim 1 comprising a circuit for automatically controlling the sensitivity threshold whereat said receiver is protected from the influence of parasitic noises.

3. Apparatus as set forth in claim 1, wherein said eletrical and electronic means mounted in said second input line of said coincidence detector for shifting the transmission of signals in said first input line by a time period equal to the time necessary for the sound signal to cover the distance from the apparatus to the reflection surface and back for the given value of said distance, comprises a monostable multivibrator having an adjustable unstable period which is adapted to transmit the electrical signal received from the first input line with a time shift equal to the time period of the unstable period adjusted as a function of the given distance.

4. Apparatus as set forth in claim 3, wherein the monostable multivibrator comprises a time-constant circuit and a nonlinear temperature-responsive element mounted in this circuit for automatically correcting the adjustment of the unstable period of this monostable multivibrator by keeping this adjustment in conformity with the given value of said distance.

5. An apparatus as set forth in claim 1, wherein said electrical and electronic means connecting said pickup device to said emitter comprise in series, from said pickup device, a receiver adapted to amplify the electrical signals transmitted from said pickup device, a first monostable multivibrator having an unstable period longer than the duration of the signals transmitted from said emitter, a second monostable multivibrator receiving the eletcrical signals from said first monostable multivibrator, a released multivibrator emitting short electrical signals when the electrical signals transmitted from said second monostable multivibrator are received by said generator, a third monostable multivibrator adapted, on receipt of the short electrical signals from said released generator, to emit modulated electrical signals having the same duration as said sound signals to be produced, and an emitter adapted to transmit electrical signals to the transducer when said emitter is released by the modulated electrical signals from said third monostable multivibrator.

6. An apparatus as set forth in claim 5, wherein said means for emitting an initial sound signal to be directed towards the acoustically reflecting surface are incorporated in said released generator and consist of a relaxation system emitting by itself short periodic electrical signals with a time period longer than the time necessary for a sound signal to cover the distance from said apparatus to said surface, and back, which corresponds to its range limit, one of said periodic signals being transmitted to said modulation monostable multivibrator only if it is not preceded and cancelled by an electrical signal from said pickup device.

7. An apparatus as set forth in claim 6, which comprises a fourth monostable multivibrator connected to the input of the released generator and of which the integrated electrical signals react on the relaxation system of said released generator by correcting the duration of the relaxation period in the direction to vary the duration of the travel, in both directions, of the sound signals emitted and received by the apparatus.

References Cited
UNITED STATES PATENTS 3,283,292  11/1966  Kay _____ 340—1

RICHARD A. FARLEY, *Primary Examiner.*